United States Patent Office 3,437,825
Patented Apr. 8, 1969

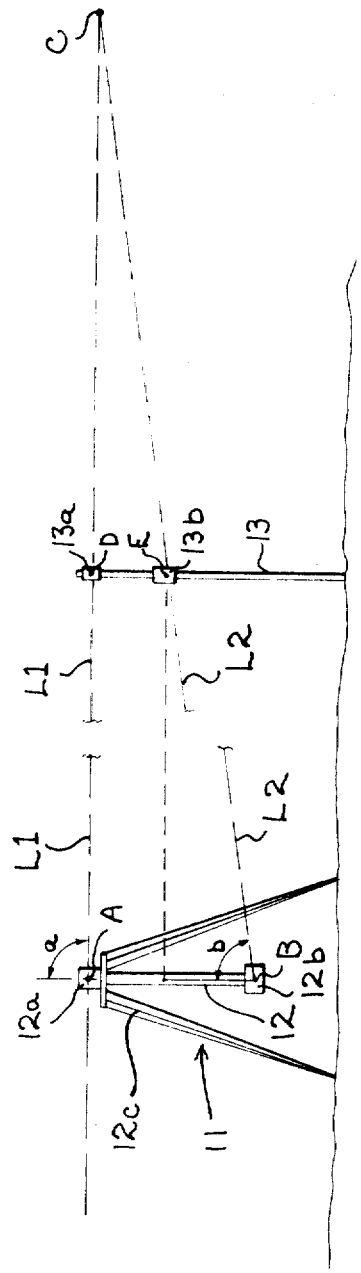

3,437,825
DISTANCE MEASURER USING CONVERGING SIGHT BEAMS AND MOVABLE PHOTORECEPTORS
Robert H. Studebaker, Dayton, Ohio, assignor to Process Equipment Co. of Tipp City, a corporation of Ohio
Filed Oct. 20, 1966, Ser. No. 588,117
Int. Cl. H01j 39/12; G02b 27/00
U.S. Cl. 250—220      6 Claims

ABSTRACT OF THE DISCLOSURE

This invention relates to a distance measuring system utilizing laser beam projecting apparatus which projects two laser beams along converging paths from vertically spaced points at a reference location. Vertically spaced and relatively vertically adjustable beam receivers are provided at a second location spaced from the laser beam projector. When the vertical spacing and height of both beam receivers are adjusted so that both beam receivers respectively receive the beam, the elevation of the second location and its distance from the reference location may be precisely determined.

---

This invention relates to laser beam apparatus and method useful in a precision surveying or earth working system to accurately determine distance of a distant location from a reference location. More particularly, the invention relates to a distance measuring system utilizing laser beam projecting apparatus for projecting two laser beams along converging paths from vertically spaced points at a reference location and utilizing means at a second location spaced from the laser beam projector for receiving the converging laser beams. By means of the laser beam measuring system of the present invention, the elevation of the second location and its distance from the location of the laser beam projector may be precisely and rapidly determined from the elevation of, and spacing between, the intercepted laser beams at the second location.

As disclosed in my copending United States patent applications Ser. No. 468,821, filed July 1, 1965; Ser. No. 474,684, filed July 26, 1965; Ser. No. 532,944, filed Mar. 9, 1966; and Ser. No. 556,018, filed June 8, 1966, all assigned to the assignee of this application, it is known that numerous operations employed in surveying, earth working and the like may be performed more rapidly and/or more precisely by projecting a rotating or oscillating laser beam along a path which will be intercepted by a laser beam receiver at a location remote from the laser beam projector. This technique has utility, for example, in determining the elevation of the second location, with respect to the elevation at the laser beam projector, when the second station is spaced from the projector in a horizontal direction. However, the foregoing copending applications, and other known prior art references, fail to disclose a satisfactory system for rapidly and accurately determining the horizontal distance of a laser beam receiver from the laser beam projector.

Accordingly, it is an object of the present invention to provide a laser beam measuring system for precisely and accurately determining the distance of a laser beam receiver from a laser beam projector.

It is a further object of the present invention to provide a laser beam measuring system which is not only effective to precisely and accurately determine the vertical elevation of a given point from a horizontal datum plane, but which is also effective to precisely and accurately determine the horizontal distance of the given point from the laser beam projector.

It is a further object of the present invention to provide improved laser beam projecting apparatus and method having utility in a laser beam measuring system.

For a further understanding of the present invention, attention is directed to the following portion of the specification, the drawing and the appended claims.

In the drawing:

The sole figure is a schematic horizontal view of apparatus in accordance with the present invention and having utility in practicing the method of the present invention.

In accordance with the present invention, there is provided laser beam projecting apparatus, designated generally by reference character 11, and comprising laser beam generating means 12 supported in a vertical orientation by a tripod structure 12c, as in the manner described in the aforementioned copending applications Ser. No. 474,684, filed July 26, 1965, and Ser. No. 556,018, filed June 8, 1966. Laser beam generating means 12 serves to generate two oppositely directed laser beams, and preferably comprises a single laser beam generator which is effective to produce two laser beams, such as a gas laser manufactured and sold by Perkin-Elmer Corporation of New Britain, Conn., under the designation Model No. 5200; however, the use of a pair of individual laser beam generators oriented in a fashion to generate two oppositely directed beams is also contemplated.

Laser beam generating means 12 further comprises spaced apart deflecting means 12a and 12b, such as pentagonally shaped prisms, for deflecting the oppositely directed laser beams from locations in such deflecting means, which may be considered to be points A and B, respectively, along paths L1 and L2 which converge at a distant point C which forms a triangle with points A and B. To simplify reception of the converging laser beams at a location remote from the location of projecting apparatus 11, deflecting means 12a and 12b are each caused to rotate or oscillate in a periodically repeated manner, so that the first and second laser beams are projected in sweeping paths which periodically include paths L1 and L2, respectively. In this manner, there will be an infinite number of paths or lines in a given plane where each of beams from deflector means 12a and 12b can be received.

When the angular relationships between paths L1 and L2 are established with great accuracy, which may be readily accomplished using equipment of the foregoing character, the distance of point C from laser beam projecting apparatus 11 may be calculated from principles of trigonometry with a degree of accuracy suitable for use in surveying. For example, when laser beam generating means 12 is in a vertical orientation, and when deflecting means 12a and 12b are arranged to deflect the laser beams along paths L1 and L2 which are at angles of 90° and 89°46′ to the vertical axis of generating means 12, shown as angles a and b, respectively, in the drawing, and when points A and B of means 12a and 12b are spaced 5′0″ from one another, then the horizontal distance of point C from the axis of generating means 12 (along line AC) will be 1227.76 feet.

With distances AB and AC known with precision, it is possible to rapidly and accurately determine the distance from laser beam projecting apparatus 11 of any location spaced closer to apparatus 11 than point C by providing, at such location, a vertically oriented target rod 13 having laser beam receivers 13a and 13b mounted thereon. Receivers 13a and 13b are vertically movable on target rod 13 to positions along paths L1 and L2, respectively, each receiver, preferably, being constructed and assembled to the target rod in the manner described in my aforesaid copending application Ser. No. 532,944, filed Mar. 9, 1966. By such a construction there will be provided a positive sensible indication when receivers 13a and 13b are respectively precisely aligned with the centers of the laser beams being projected along paths L1 and L2, considered as being at points D and E on the drawing. At that time, the vertical distance separating 13a and 13b may be readily determined, as from the markings customarily provided on surveying target rods.

From a knowledge of dimension AC and determination of dimension DE, the horizontal distance between laser beam projecting apparatus 11 and target rod 13, viz., dimension AD, when angle $a$ is 90°, may be readily calculated by principles of plane geometry. Thus, $$AD = AC - DC = AC - \frac{AC \times DE}{AB}$$

With AC and AB normally being fixed quantities, it is readily possible to prepare a scale for values of AC in terms of DE.

For determination of the distance of a location located a substantial distance in the horizontal direction from the location of projecting apparatus, there should be but a very small difference between angles $a$ and $b$, e.g., of the order of a fraction of a degree, and neither angle should differ substantially from a right angle to the vertical axis of laser generator 12. Preferably, one of angles $a$ and $b$, shown as angle $a$ in the drawing, should be precisely at 90° to the axis of laser generator, at least when target rod 13 is being used to determine the distance from projecting apparatus 11 of locations which are not at elevations differing excessively from the elevation of projecting apparatus 11. In such a system, minor differences in elevation between the reference location of projecting apparatus and the location of target rod 13 may be readily ascertained with accuracy by noting the vertical position of receiver 13a on target rod 13.

The best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

I claim:
1. Distance measuring apparatus comprising:
   (1) laser beam generator means producing two laser beams;
   (2) a pair of reflecting means respectively receiving said laser beams and reflecting same along two converging paths;
   (3) a pair of laser beam receivers at a location remote from said reflecting means and spaced apart in the plane defined by said converging paths, each of said receivers being capable of indicating the center of an incident laser beam;
   (4) means for adjusting the spacing of said receivers to permit both receivers to concurrently receive said laser beams, whereby the spacing of said receivers at the position of concurrent beam reception indicates the distance of said receivers from said reflecting means.

2. The apparatus defined in claim 1 wherein said reflecting means are continuously rotated about a common axis.

3. The apparatus defined in claim 1 wherein one of said converging paths is essentially horizontal and means are provided for indicating the vertical height of at least one of said receivers, whereby the relative elevation of said remote location may be indicated.

4. The method of determining the distance of a second location remote from a first reference location comprising the steps of: projecting first and second laser beams along converging paths toward the second location from points at the first location which are spaced apart from one another by a known distance; concurrently receiving the first and second laser beams at spaced points at the second location respectively corresponding to the centers of said beams; and determining at said second location the distance separating the points at which the centers of the first and second laser beams are received at the second location.

5. The method in accordance with claim 4 wherein the first and second laser beams are projected through sweeping paths each of which periodically passes through the second location.

6. The method in accordance with claim 4 wherein the first and second locations are separated from one another along a line extending substantially horizontally, and wherein the first and second laser beams are projected from vertically spaced points along first and second paths which form angles, with respect to the vertical, which differ from one another by a small amount and neither of which differs substantially from 90°, plus the step of determining the height of at least one of said laser beams at said second location, whereby both the range and elevation of said second location relative to the first location may be determined.

References Cited
UNITED STATES PATENTS

| | | |
|---|---|---|
| 2,297,534 | 9/1942 | Brulin. |
| 2,316,751 | 4/1943 | Adler. |
| 3,087,154 | 4/1963 | Kuecken. |
| 3,224,319 | 12/1965 | Robert et al. |

RALPH G. NILSON, *Primary Examiner.*

M. ABRAMSON, *Assistant Examiner.*

U.S. Cl. X.R.

88—1